(12) United States Patent
Yoshizaki

(10) Patent No.: US 8,108,705 B2
(45) Date of Patent: Jan. 31, 2012

(54) POWER SUPPLYING DEVICE, POWER SUPPLY CONTROLLING METHOD, POWER SUPPLY CONTROLLING PROGRAM AND NETWORK SYSTEM

(75) Inventor: Daisuke Yoshizaki, Tokyo (JP)

(73) Assignee: NEC Corporation, Tokyo (JP)

( * ) Notice: Subject to any disclaimer, the term of this patent is extended or adjusted under 35 U.S.C. 154(b) by 521 days.

(21) Appl. No.: 12/397,738

(22) Filed: Mar. 4, 2009

(65) Prior Publication Data

US 2009/0228723 A1 Sep. 10, 2009

(30) Foreign Application Priority Data

Mar. 7, 2008 (JP) ................................. 2008-058794

(51) Int. Cl.
*G06F 1/00* (2006.01)
*G06F 1/32* (2006.01)
*G06F 3/00* (2006.01)
*G06F 15/16* (2006.01)

(52) U.S. Cl. ........... 713/324; 713/320; 710/29; 709/233

(58) Field of Classification Search .................. 713/300, 713/310, 320, 323, 324; 710/29, 34–35, 710/60; 709/233
See application file for complete search history.

(56) References Cited

U.S. PATENT DOCUMENTS

| | | | | |
|---|---|---|---|---|
| 2003/0065958 A1* | 4/2003 | Hansen et al. | ................ | 713/300 |
| 2007/0041321 A1* | 2/2007 | Sasaki et al. | .................. | 370/235 |
| 2007/0136614 A1* | 6/2007 | Heath et al. | ................... | 713/300 |
| 2007/0288784 A1* | 12/2007 | Koper et al. | .................. | 713/324 |
| 2008/0114997 A1* | 5/2008 | Chin | ............................ | 713/321 |
| 2009/0070603 A1* | 3/2009 | Diab et al. | ..................... | 713/300 |

FOREIGN PATENT DOCUMENTS

| | | |
|---|---|---|
| JP | 2006085503 A | 3/2006 |
| WO | WO 2006077569 A1 * | 7/2006 |

* cited by examiner

*Primary Examiner* — Thomas J Cleary

(57) ABSTRACT

A power supplying device for supplying power through a network to a plurality of communication terminals to transmit or receive data in a form of a packet including: a power supply controlling unit to preset a count of the communication terminals which are to be targeted for power supply, for every predetermined time period, out of the plurality of communication terminals, and to measure a flow rate of packets to be transmitted or received for every communication terminal to which power is being supplied, out of the communication terminals targeted for the power supply in each time period, and to supply power to at least one communication terminal to which power is not yet being supplied, out of the communication terminals targeted for the power supply, when the measured flow rate of packets in any communication terminal becomes not less than a predetermined threshold.

19 Claims, 4 Drawing Sheets

FIG.2

| [1] Port | [2] Connected Device | [3] Belonging VLAN | [4] Default Value | [5] Priority | [6] ON Band | [7] OFF Band |
|---|---|---|---|---|---|---|
| Port A23 | PoE Power Receiving Device A2 | 1 | 8 O'clock-18 O'clock : 2 Unit | 1 | 52 Mbps | 0 bps |
| Port B24 | PoE Power Receiving Device B3 | | 18 O'clock-8 O'clock : 1 Unit | 2 | | |
| Port C25 | PoE Power Receiving Device C4 | | | 3 | | |
| Port D26 | PoE Power Receiving Device D5 | | | 4 | | |

FIG.3

| Port | [8] Initial State (8 O'clock - 18 O'clock) | | [9] Status A | | [10] Status B | | [11] Status C | | [12] Status D | | [13] Status E | | [14] Status F | |
|---|---|---|---|---|---|---|---|---|---|---|---|---|---|---|
| | Use Band | PoE Function | Use Band | PoE Function | Use Band | PoE Function | Use Band | PoE Function | Use Band | PoE Function | Use Band | PoE Function | Use Band | PoE Function |
| Port A23 | 0 Mbps | ON | 15 Mbps | ON | 53 Mbps | ON | 53 Mbps | ON | 0 Mbps | OFF | - | OFF | - | OFF |
| Port B24 | 0 Mbps | ON | 10 Mbps | ON | 10 Mbps | ON | 53 Mbps | ON | 15 Mbps | ON | 15 Mbps | ON | 0 Mbps | ON |
| Port C25 | - | OFF | - | OFF | - | ON | 10 Mbps | ON | 10 Mbps | ON | 10 Mbps | ON | 10 Mbps | ON |
| Port D26 | - | OFF | - | OFF | - | OFF | 0 Mbps | OFF | 10 Mbps | ON | 0 Mbps | OFF | - | OFF |

*FIG.4*

| [1] Port | [2] Connected Device | [3] Belonging Group | [4] Default Value | [5] Priority | [6] ON Band | [7] OFF Band |
|---|---|---|---|---|---|---|
| Port A23 | PoE Power Receiving Device A2 | 1 | 8 O'clock- 18 O'clock : 2 Unit | 1 | 52 Mbps | 0 bps |
| Port B24 | PoE Power Receiving Device B3 | | 18 O'clock- 8 O'clock : 1 Unit | 2 | | |
| Port C25 | PoE Power Receiving Device C4 | | | 3 | | |
| Port D26 | PoE Power Receiving Device D5 | | | 4 | | |

POWER SUPPLYING DEVICE, POWER SUPPLY CONTROLLING METHOD, POWER SUPPLY CONTROLLING PROGRAM AND NETWORK SYSTEM

INCORPORATION BY REFERENCE

This application is based upon and claims the benefit of priority from Japanese Patent Application No. 2008-058794, filed on Mar. 7, 2008, the disclosure of which is incorporated herein in its entirely by reference.

BACKGROUND OF THE INVENTION

1. Field of the Invention

The present invention relates to a power supplying device, power supply controlling method, power supply controlling program, and network system and more particularly to the power supplying device, the power supply controlling method, the power supply controlling program, and the network system being suitably applied to a PoE (Power over Ethernet®)-ready switch/router and the like to feed power through Ethernet to a plurality of communication terminals to transmit or receive data in a form of a packet.

2. Description of the Related Art

A PoE-ready switch/router to feed power to a plurality of communication terminals to transmit or receive data in a form of a packet through the Ethernet is configured to supply power, if a PoE function is set to be in an ON state, unless a user intentionally sets the PoE function to be an in OFF state and, therefore, a problem arises that a constant amount of power is consumed irrespective of a use status of a network. To solve this problem, a power supplying device that can reduce power consumption of an entire network is proposed.

The power supplying device of this type is disclosed in Patent Reference 1 (Japanese Patent Application Laid-open No. 2006-085503). According to the power supplying device, whether or not the communication terminal in which part or all of the connecting terminals are connected to a connector serving as a power supplying terminal is in a non-power requiring state is judged based on time data and a time period representing and non-power feeding time period, or based on a relation between the detection of frequency requiring power supply and time threshold. Then, the power supply is stopped to the communication terminal using the corresponding connector. This is attributable to reduce unnecessary power supply. Moreover, the communication state is measured based on power consumption of each communication terminal.

However, the above technology disclosed in the Patent Reference has the following problems. That is, in the above conventional PoE-ready switch/router, the ON/OFF state for the PoE function is set by manipulation of the user, however, it is actually difficult to make settings of the ON/OFF state of the PoE function based on a use state of the PoE power receiving device. A problem arises that no dynamic control is made according to actual use state of the PoE power receiving device, as a result, allowing power to be fed even to the PoE power receiving device not in use, thus causing power to be consumed wastefully.

Also, in the power supplying device disclosed in the Patent Reference 1, the power control is performed for every port of each communication terminal, however, the communication state is judged based on power consumption of each communication terminal and, therefore, the content of the technology disclosed in the Patent Reference 1 is different from that of the present invention. Moreover, in the power supplying device disclosed in the Patent Reference 1, mounting of a measuring circuit to measure power at each port is required and, therefore, some measure has to be taken in the case where an amount of power consumption of a device to be targeted varies in terms of hardware. In this case, for example, a complicated process such as settings of a threshold value for power consumption for each device is made necessary.

SUMMARY OF THE INVENTION

In view of the above, it is an object of the present invention to provide a power supplying device capable of reducing power consumption in a network when power is supplied to a plurality of communication devices to receive data in the form of a packet and a power supply controlling method, a power supply controlling program, and a network system using the above power supplying device.

According to a first aspect of the present invention, there is provided a power supplying device for supplying power through a network to a plurality of communication terminals to transmit or receive data in a form of a packet including:

a power supply controlling unit to preset a count of the communication terminals which are to be targeted for power supply, for every predetermined time period, out of the plurality of communication terminals, and to measure a flow rate of packets to be transmitted or received for every communication terminal to which power is being supplied, out of the communication terminals targeted for the power supply in each time period, and to supply power to at least one communication terminal to which power is not yet being supplied, out of the communication terminals targeted for the power supply, when the measured flow rate of packets in any communication terminal becomes not less than a predetermined threshold.

According to a second aspect of the present invention, there is provided a power supply controlling method to be used in a power supplying device to supply power through a network to a plurality of communication terminals to transmit or receive data in a form of a packet, including:

presetting a count of the communication terminals which are to be targeted for power supply, for every predetermined time period, out of the plurality of communication terminals;

measuring a flow rate of packets to be transmitted or received for every communication terminal to which power is being supplied, out of the communication terminals targeted for the power supply in each time period; and supplying power to at least one communication terminal to which power is not yet being supplied, out of the communication terminals targeted for the power supply, when the measured flow rate of packets in any communication terminal becomes not less than a predetermined threshold.

According to a third aspect of the present invention, there is provided a power supply controlling program stored in a computer-readable storage medium to have a computer control a power supplying device for supplying power through a network to a plurality of communication terminals to transmit or receive data in a form of a packet including:

a power supply controlling unit to preset a count of the communication terminals which are to be targeted for power supply, for every predetermined time period, out of the plurality of communication terminals, and to measure a flow rate of packets to be transmitted or received for every communication terminal to which power is being supplied, out of the communication terminals targeted for the power supply in each time period, and to supply power to at least one communication terminal to which power is not yet being supplied, out of the communication terminals targeted for the power supply, when the measured flow rate of packets in any communication terminal becomes not less than a predetermined threshold.

According to a fourth aspect of the present invention, there is provided a network system having a plurality of communication terminals to transmit or receive data in a form of a packet and a power supplying device to supply power through a network to the plurality of communication terminals wherein the power supplying device has a power supply controlling unit to preset a count of the communication terminals which are to be targeted for power supply, for every predetermined time period, out of the plurality of communication terminals, and to measure a flow rate of packets to be transmitted or received for every communication terminal to which power is being supplied, out of the communication terminals targeted for the power supply in each time period, and to supply power to at least one communication terminal to which power is not yet being supplied, out of the communication terminals targeted for the power supply, when the measured flow rate of packets in any communication terminal becomes not less than a predetermined threshold.

With the above configurations, the number of communication terminals receiving power out of a plurality of communication terminals is preset for every predetermined time period and a flow rate of transmitted and received packets is measured in every communication terminal receiving power is measured by the power supply controlling unit and power is fed to the communication terminal when the flow rate becomes not less than a predetermined threshold and if there exist any communication terminal not receiving power and, therefore, power consumption can be reduced to a minimum without affecting the communication of a user.

BRIEF DESCRIPTION OF THE DRAWINGS

The above and other objects, advantages, and features of the present invention will be more apparent from the following description taken in conjunction with the accompanying drawings in which:

FIG. 2 is a diagram showing one example of a schedule stored in RAM (Random Access Memory) in the FIG. 1;

FIG. 3 is a diagram showing one example of a change of status and transition of operations of the network system in FIG. 1; and FIG. 4 is a diagram showing a modified example of the schedule stored in the RAM in the FIG. 1.

DETAILED DESCRIPTION OF THE PREFERRED EXEMPLARY EMBODIMENTS

Figure 1:
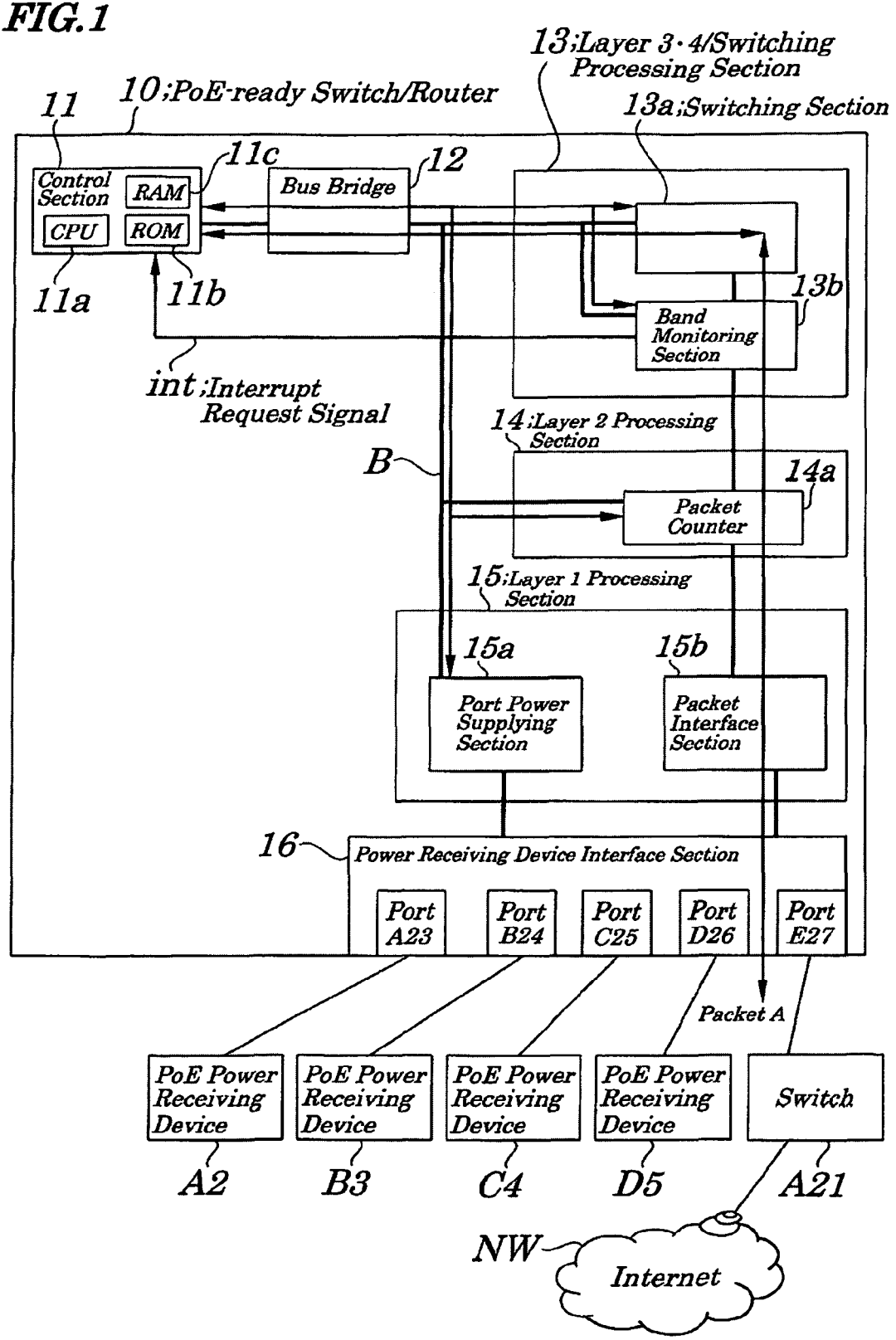
FIG. 1 is a block diagram showing electric configurations of main components of a network system having a power supplying device according to an exemplary embodiment of the present invention.

Best modes of carrying out the present invention will be described in further detail using various exemplary embodiments with reference to the accompanying drawings.

As preferable mode, there is provided a power supplying device for supplying power through a network to a plurality of communication terminals to transmit or receive data in a form of a packet including:

a power supply controlling unit to set priority for supplying power to the plurality of communication terminals and to preset a count of the communication terminals which are to be targeted for power supply, for every predetermined time period, out of the plurality of communication terminals, and to measure a flow rate of packets to be transmitted or received for every communication terminal to which power is being supplied, out of the communication terminals targeted for the power supply in each time period, and to supply power to at least one communication terminal to which power is not yet being supplied, out of the communication terminals targeted for the power supply, in accordance with the priority for supplying the power, when the measured flow rate of packets in any communication terminal becomes not less than a first threshold, and on an other hand, to stop the power supply to the communication terminal in which the flow rate becomes not more than a second threshold being less than the first threshold.

Also, an additional preferable mode is one wherein the power supply controlling unit including:

a power supplying section;

a packet flow rate measuring section to measure the flow rate of packets to be transmitted or received for every communication terminal to which power is being supplied, out of the communication terminals targeted for the power supply in each time period; and a control section to supply power through the power supplying section to at least one communication terminal to which power is not yet being supplied, out of the communication terminals targeted for the power supply, when the measured flow rate of packets in any communication terminal, obtained from the packet flow rate measuring section, becomes not less than a first threshold, and on an other hand, to stop the power supply to the communication terminal in which the flow rate becomes not more than a second threshold being less than the first threshold.

Also, a more preferable mode is one wherein the control section holds, when a packet arrives at the communication terminal to which the power is not yet being supplied, the packet and supplies the power to the communication terminal to which the power is not yet being supplied through the power supplying section and transfers the arrived packet to the communication terminal to which the power is not yet being supplied.

Also, a more preferable mode is one wherein the control section has a schedule to set the priority for supplying the power to a group of the communication terminals which are to be targeted for power supply or supply stop, and to preset the count of the communication terminals which are to be targeted for the power supply, for every predetermined time period, out of the group of communication terminals.

Exemplary Embodiment

FIG. 1 is a block diagram showing electric configurations of main components of a network system having a power supplying device according to an exemplary embodiment of the present invention. The network system of the present invention, as shown in FIG. 1, includes a PoE-ready switch/router 10 (power supplying device including a power supply controlling unit), PoE power receiving devices (communication terminals) A2, B3, C4, and D5, and a switch A21. Each of the PoE power receiving devices A2, B3, C4 and D5 has a function as a communication terminal to transmit and receive data in the form of a packet and operates by power received through an unillustrated RJ45 cable from the PoE-ready switch/router 10.

PoE-ready switch/router 10 is a system having a function of transferring a TCP•UDP/IP (Transmission Control Protocol•User Datagram Protocol/Internet Protocol) packet and is made up of a control section 11, bus bridge 12, layer 3•4/switching processing section 13, layer 2 processing section 14, layer 1 processing section 15, power receiving device interface section 16 and supplies power through a network (for example, Ethernet®) to the above PoE power receiving devices A2, B3, C4, and D5. Moreover, the layers 1, 2, 3, and 4 are operated on the basis of an OSI (Open System Interconnection) protocol.

The power receiving device interface section 16 has ports A23, B24, C25, C25, and D26 to be connected to the PoE power receiving devices A2, B3, C4, and D5 and supplies power to the PoE power receiving devices A2, B3, C4, and D5. The power receiving device interface 16 also has a port E27 to be connected to the switch A21. To the switch A21 are connected other networks such as the Internet NW. The layer 1 processing section 15 has a port power supplying section 15a and a packet interface section 15b. The port power supplying section 15a has a function (PoE function) of supplying power to each of the ports A23, B24, C25, and D26 and is configured so that an ON/OFF state for the PoE can be changed for every port according to settings. The packet interface section 15b is an interface to relay signals between the power receiving device interface section 16 and the layer 2 processing section 14. The layer 2 processing section 14 has a packet counter 14a. The packet counter 14a counts a rate of flow of transmitted and received packets for each of the PoE power receiving devices A2, B3, C4, and D5 connected to each of the ports A23, B24, C25, D26, and E27 which receives power. The layer 3•4/switching processing section 13 has a switching section 13a to perform a process of transferring a packet and a band monitoring section 13b to monitor a band of a packet. The band monitoring section 13b, by making settings, monitors the rate of flow of transmitted and received packets for each of the ports A23, B24, C25, D26, and E27 and, when the flow rate of the packets becomes not less than or not more than a predetermined threshold value, transmits an interrupt request signal "int" to the control section 11.

The control section 11 has a CPU (Central Processing Unit) 11a serving as a computer to control the entire PoE-ready switch/router 10 and a ROM (Read Only Memory) 11b storing power supplying programs to operate the CPU 11a and is connected through the bus bridge 12 and control bus B to the layer 3•4/switching processing section 13, layer 2 processing section 14, and layer 1 processing section 15 to set each section and to monitor the state of transmitting and receiving counter of a packet or the like. In the exemplary embodiment in particular, the control section 11 has a RAM 11c storing a schedule to control each section making up the PoE-ready switch/router 10. Also, in the RAM 11c, the PoE power receiving devices A2, B3, C4, and D5 to which power is to be supplied or the power supply is stopped are made to belong to one group to set the power supply priority for a communication terminal belonging to the same group and a schedule is stored which sets, in advance, the number of PoE power receiving devices to receive power for every predetermined time period.

Moreover, the control section 11, when the rate of flow of the packets to be measured by the packet counter 14a becomes not less than the threshold value and the PoE power receiving device not receiving power exists, feeds power through the layer 1 processing section 15 and the power receiving device interface section 16 to the PoE power receiving devices not receiving power and, when the flow rate of the packets becomes not more than a second threshold value being less than the first threshold value, stops the power supply to the PoE power receiving device. The control section 11, when a packet arrives at the PoE power receiving device not receiving power, holds the arrived packet and feeds power through the layer 1 processing section 15 and the power receiving device interface section 16 to the PoE power receiving device not receiving power.

FIG. 2 shows one example of a schedule stored in the RAM in FIG. 1. FIG. 3 shows one example of a change of status and transition of operations of a network system in FIG. 1. By referring to FIGS. 2 and 3, a power supply controlling method to be used in the PoE-ready switch/router 10 (power supplying device) is described. In the PoE-ready switch/router 10 of the exemplary embodiment, the PoE power receiving devices A2, B3, C4, and D5 are made to belong to one group (for example, virtual LAN [VLAN]) and power supply priority is set to the PoE power supplying receiving devices A2, B3, C4, and D5 and the number of PoE power receiving devices to receive power is set for every predetermined time period. Then, the rate of flow of the transmitted and received packets is measured by the packet counter 14a for every PoE power receiving device and, when the measured rate of the flow of the transmitted and received packets becomes not less than the first threshold value and the PoE power receiving device not receiving power exists, power is fed to the PoE power receiving device. On the other hand, when the rate of flow of transmitted and received packets becomes not more than the second threshold value being less than the first threshold value, the power supply to the PoE power receiving device is stopped. In the PoE-ready switch/router 10, when a packet arrives at the PoE power receiving device not receiving power, the arrived packet is held and, power is fed to the PoE power receiving device and the packet is transferred to the PoE power receiving device.

That is, in the schedule of the RAM 11c, as shown in FIG. 2, an item [1] includes the ports A23, B24, C25 and D26 of the PoE-ready switch/router 10. Also, in an item [2], the PoE power receiving devices A2, B3, C25, and D26 are set respectively for the port A23, B24, C25, and D26 to which the PoE power receiving devices A2, B3, C25, and D26 are respectively connected. In an item [3], the VLAN to which each of the ports A23, B24, C25, and D26 belongs is set to "1". This causes the ON/OFF control for the power supply to be exerted for every VLAN to which each of the ports A23, B24, C25, and D26 belongs. In an item [4], the ON/OFF setting for the power supply in every time for VLAN is shown and a minimal number of ports for which the power supply is put into an ON state within a given time period is shown as a default value. In an item [5], the power supply priority for the PoE power receiving devices A2, B3, C4, and D5 is shown and the power supply is put in an ON state in decreasing order of priority.

In an item [6], the first threshold value (ON band) of a flow rate of the transmitted and received packet used when power is supplied to the PoE power receiving device is shown. In this case, the band applied to any out of the ports A23, B24, C25, and D26 for which the power supply is in an ON state is monitored and, when the band of any port becomes not less than 52 Mbps set in the item [6], the power supply is put in an ON state for a port with high priority out of ports A23, B24, C25, and D26 for which the power supply is now in an OFF state. In an item [7], the second threshold value (OFF band) of flow rate of the transmitted and received packets used when power supply to the PoE power receiving device is stopped is shown. In this case, the band used in any port out of the ports A23, B24, C25, and D26 for which the power supply is in an OFF state is monitored and, when the band used in any port becomes not more than 0 Mbps set in the item [7], the power supply is put in an OFF state for the port whose band becomes not more than 0 Mbps. However, the number of ports for which the power supply is in an ON state should not be more than the number of ports set in the item [4], "default value".

In the network system, an ON band and OFF band are set to the band monitoring section 13b by the control section 11 based on the schedule shown in FIG. 2. In the band monitoring section 13b, according to the above settings, a rate of flow of the transmitted and received packet for every port is monitored and, when the rate of flow becomes not less than the first threshold value or not more than the second threshold value, the band monitoring section 13b transmits an interruption request signal "int" to the control section 11 for notification. The control section 11, when receiving the interruption request signal "int" from the band monitoring section 13b, checks a status of the band monitoring section 13b via the control bus B and, if the flow rate exceeds the ON band, and makes settings on the port power supplying section 15a so that the PoE power supply to other ports is started. Moreover, if the status of the band monitoring section 13b shows that the flow rate for a port is not more than the OFF band, the PoE power supply to the port is stopped.

That is, as shown in FIG. 3, in the initial state (in the time period between 8 to 18 O'clock) shown in the item [8], since the priority order of the power supply function (PoE function) for the two ports A23 and B24 is high (priority thereof being 1 and 2 respectively), the A23 and B24 are in an ON state. The control section 11 of the PoE-ready switch/router 10 is monitoring the use state of each port network by performing polling on the packet counter 14a. In the status A shown in the item [9], when the band used in the port A23 is 15 Mbps and the band used in the port B24 is 10 Mbps, the ON state of the PoE function remains unchanged. In the status B shown in the item [10], the band used in the port A23 exceeds the band (52 Mbps) set in the item [6] and, as a result, the PoE function of the port C25 with the next high priority (priority thereof being 3) is put into an ON state.

In the status C shown in the item [11], the band used in the port A23 becomes 53 Mbps and the band used in the port B24 becomes 53 Mbps and the band used in the port C25 becomes 10 Mbps and the band used in the port B24 exceeds the band (52 Mbps) set in the item [6] and, as a result, the PoE function of the last port D26 is put into an ON state. In the status D shown in the item [12], the band used in the port A23 becomes 0 Mbps and the band used in the port B24 becomes 15 Mbps and the band used in the port C25 becomes 10 Mbps and the band used in the port A23 becomes not more than the band (10 bps) set in the item [7] and, as a result, the PoE function of the port A23 is put into an OFF state. In the status E shown in the item [13], the band used in the port B24 becomes 15 Mbps and the band used in the port C25 becomes 10 Mbps and, further, the band used in the port D26 becomes 0 Mbps and the band used in the port D26 becomes not more than the band (0 bps) set in the item [7] and, as a result, the PoE function of the port D26 is put into an OFF state. In the status F shown in the item [14], the band used in the port B24 becomes 0 Mbps and the band used in the port C25 becomes 10 Mbps and, further, the number of ports being in an ON state becomes 3 which is set, as a default value, in the item [4] and, as a result, the ON state/OFF state of the PoE function are held.

The layer 3·4/switching processing section 13, when receiving a packet A addressed to the PoE power receiving device to which power is not supplied, transfers the received packet A to the control section 11 via the control bus B. The control section 11 applies power to the PoE power receiving device to which no power is supplied and holds the packet A and performs ARP (Address Resolution Protocol) resolution and, thereafter, transfers the packet A to any corresponding PoE power receiving device. After the ARP resolution, the power supply is stopped to other ports to which the corresponding PoE power receiving device is not connected.

Moreover, the control section 11, when rising time of the PoE power receiving device is slow, is allowed to make a proxy response to the packet A in some cases.

As described above, according to the exemplary embodiment, one of the PoE power receiving devices A2, B3, C4, and D5 is made to belong the VLAN and a flow rate of a transmitted and received packets is measured for every PoE power receiving device to which the power is supplied by the packet counter 14a and, when the flow rate of the measured packets becomes not less than the first threshold value and the PoE power receiving device to which no power is supplied exists, power is supplied to the PoE power receiving device and, when the flow rate of the transmitted and received packets becomes not more than the second threshold value being less than the first threshold value, the power supply to the PoE power receiving device is stopped whereby power consumption is reduced to a minimum level without affecting the communication of the user. Also, in the PoE switch/router 10, when a packet arrives at the PoE power receiving device to which no power is supplied, the packet is held and power is supplied to the PoE power receiving device and the packet is transferred and, therefore, even if there is any PoE power receiving device to which no power is supplied, operations can be performed to respond to the arrival of a packet. Moreover, since no power is supplied to the PoE power receiving device not being in use, the operating time of the PoE power receiving device is shortened and, unlike the case where power continues to be supplied, the possibility of failure becomes low.

While the invention has been particularly shown and described with reference to exemplary embodiments thereof, the invention is not limited to these exemplary embodiments. It will be understood by those of ordinary skill in the art that various changes in form and details may be made therein without departing from the sprit and scope of the present invention as defined by the claims.

For example, in the above exemplary embodiment, the PoE function is controlled for every VLAN. However, as shown in the item [3] in FIG. 4, the PoE function may be controlled for every belonging group and, by making a plurality of ports belong to one group, the PoE function may be controlled for every group. In this case, the VLAN may be allowed to make a plurality of different ports belong to one group or a specified port out of ports belonging to one VLAN may be selected to make the selected port belong to the group, thereby enabling more detailed control.

The control section 11 monitors the packet flow rate of ports A23 to E27 by making the packet counter 14a read the number of packets and, when the flow rate of the packet exceeds an ON band, may make settings to start the PoE power supply to other ports for the port power supplying section 15a and, when the flow rate of the packet reaches an OFF band, may stop the PoE power supply to the port. By configuring as above, even in the case of the band monitoring section 13b, the ON/OFF control of the PoE power supply based on the flow rate of packets is made possible.

The present invention can be applied to the case where power is supplied via the Internet to a plurality of communication terminals which transmit and receive data in the form of a packet.

What is claimed is:

1. A power supplying device for supplying power through a network to a plurality of communication terminals to transmit or receive data in a form of a packet comprising:

a power supply controlling unit to preset a count of the communication terminals which are to be targeted for power supply, for every predetermined time period, out of said plurality of communication terminals, and to measure a flow rate of packets to be transmitted or received for every communication terminal to which power is being supplied, out of the communication terminals targeted for the power supply in each time period, and to supply power to at least one communication terminal to which power is not yet being supplied, out of the communication terminals targeted for the power supply, when the measured flow rate of packets in any communication terminal becomes not less than a predetermined threshold.

2. The power supplying device according to claim 1, wherein said power supply controlling unit holds, when a packet arrives at the communication terminal to which the power is not yet being supplied, the packet and supplies the power to said communication terminal to which the power is not yet being supplied through said power supplying section and transfers the arrived packet to said communication terminal to which the power is not yet being supplied.

3. A power supplying device for supplying power through a network to a plurality of communication terminals to transmit or receive data in a form of a packet comprising:
a power supply controlling unit to set priority for supplying power to said plurality of communication terminals and to preset a count of the communication terminals which are to be targeted for power supply, for every predetermined time period, out of said plurality of communication terminals, and to measure a flow rate of packets to be transmitted or received for every communication terminal to which power is being supplied, out of the communication terminals targeted for the power supply in each time period, and to supply power to at least one communication terminal to which power is not yet being supplied, out of the communication terminals targeted for the power supply, in accordance with the priority for supplying the power, when the measured flow rate of packets in any communication terminal becomes not less than a first threshold, and on an other hand, to stop the power supply to the communication terminal in which the flow rate becomes not more than a second threshold being less than the first threshold.

4. The power supplying device according to claim 3, wherein said power supply controlling unit comprising:
a power supplying section;
a packet flow rate measuring section to measure the flow rate of packets to be transmitted or received for every communication terminal to which power is being supplied, out of the communication terminals targeted for the power supply in each time period; and
a control section to supply power through said power supplying section to at least one communication terminal to which power is not yet being supplied, out of the communication terminals targeted for the power supply, when the measured flow rate of packets in any communication terminal, obtained from said packet flow rate measuring section, becomes not less than a first threshold, and on an other hand, to stop the power supply to the communication terminal in which the flow rate becomes not more than a second threshold being less than the first threshold.

5. The power supplying device according to claim 4, wherein said control section holds, when a packet arrives at the communication terminal to which the power is not yet being supplied, the packet and supplies the power to said communication terminal to which the power is not yet being supplied through said power supplying section and transfers the arrived packet to said communication terminal to which the power is not yet being supplied.

6. The power supplying device according to claim 4, wherein said control section has a schedule to set the priority for supplying the power to a group of the communication terminals which are to be targeted for power supply or supply stop, and to preset the count of the communication terminals which are to be targeted for the power supply, for every predetermined time period, out of the group of communication terminals.

7. A power supply controlling method to be used in a power supplying device to supply power through a network to a plurality of communication terminals to transmit or receive data in a form of a packet, comprising:
presetting a count of the communication terminals which are to be targeted for power supply, for every predetermined time period, out of said plurality of communication terminals;
measuring a flow rate of packets to be transmitted or received for every communication terminal to which power is being supplied, out of the communication terminals targeted for the power supply in each time period; and
supplying power to at least one communication terminal to which power is not yet being supplied, out of the communication terminals targeted for the power supply, when the measured flow rate of packets in any communication terminal becomes not less than a predetermined threshold.

8. A power supply controlling method to be used in a power supplying device to supply power through a network to a plurality of communication terminals to transmit or receive data in a form of a packet, comprising:
setting priority for supplying power to said plurality of communication terminals;
presetting a count of the communication terminals which are to be targeted for power supply, for every predetermined time period, out of said plurality of communication terminals;
measuring a flow rate of packets to be transmitted or received for every communication terminal to which power is being supplied, out of the communication terminals targeted for the power supply in each time period;
supplying power to at least one communication terminal to which power is not yet being supplied, out of the communication terminals targeted for the power supply, in accordance with the priority for supplying the power, when the measured flow rate of packets in any communication terminal becomes not less than a first threshold, and on an other hand, stopping the power supply to the communication terminal in which the flow rate becomes not more than a second threshold being less than the first threshold.

9. The power supply controlling method according to claim 8, wherein provided are a power supplying section, and a packet flow rate measuring section to measure the flow rate of packets to be transmitted or received for every communication terminal to which power is being supplied, out of the communication terminals targeted for the power supply in each time period; and
wherein the power is supplied through said power supplying section to at least one communication terminal to which power is not yet being supplied, out of the communication terminals targeted for the power supply, when the measured flow rate of packets in any communication terminal, obtained from said packet flow rate measuring section, becomes not less than a first threshold, and on an other hand, to stop the power supply to the communication terminal in which the flow rate becomes not more than a second threshold being less than the first threshold.

10. The power supply controlling method according to claim 9, wherein said control section holds, when a packet arrives at a communication terminal to which the power is not yet being supplied, the arrived packet and supplies the power to said communication terminal to which the power is not yet being supplied through said power supplying section and transfers the arrived packet to which the power is not yet being supplied.

11. The power supply controlling method according to claim 9, wherein said control section has a schedule to set the priority for supplying the power to a group of the communication terminals which are to be targeted for power supply or supply stop, and to preset the count of the communication terminals which are to be targeted for the power supply, for every predetermined time period, out of the group of communication terminals.

12. A power supply controlling program stored in a computer-readable storage medium to have a computer control a power supplying device for supplying power through a network to a plurality of communication terminals to transmit or receive data in a form of a packet comprising:
a power supply controlling unit to preset a count of the communication terminals which are to be targeted for power supply, for every predetermined time period, out of said plurality of communication terminals, and to measure a flow rate of packets to be transmitted or received for every communication terminal to which power is being supplied, out of the communication terminals targeted for the power supply in each time period, and to supply power to at least one communication terminal to which power is not yet being supplied, out of the communication terminals targeted for the power supply, when the measured flow rate of packets in any communication terminal becomes not less than a predetermined threshold.

13. A power supply controlling program stored in a computer-readable storage medium to have computer control a power supplying device for supplying power through a network to a plurality of communication terminals to transmit or receive data in a form of a packet comprising:
a power supply controlling unit to set priority for supplying power to said plurality of communication terminals and to preset a count of the communication terminals which are to be targeted for power supply, for every predetermined time period, out of said plurality of communication terminals, and to measure a flow rate of packets to be transmitted or received for every communication terminal to which power is being supplied, out of the communication terminals targeted for the power supply in each time period, and to supply power to at least one communication terminal to which power is not yet being supplied, out of the communication terminals targeted for the power supply, in accordance with the priority for supplying the power, when the measured flow rate of packets in any communication terminal becomes not less than a first threshold, and on an other hand, to stop the power supply to the communication terminal in which the flow rate becomes not more than a second threshold being less than the first threshold.

14. The power supply controlling program according to claim 13, wherein said power supply controlling unit holds, when a packet arrives at the communication terminal to which the power is not yet being supplied, the packet and supplies the power to said communication terminal to which the power is not yet being supplied through said power supplying section and transfers the arrived packet to said communication terminal to which the power is not yet being supplied.

15. A network system having a plurality of communication terminals to transmit or receive data in a form of a packet and a power supplying device to supply power through a network to said plurality of communication terminals wherein said power supplying device has a power supply controlling unit to preset a count of the communication terminals which are to be targeted for power supply, for every predetermined time period, out of said plurality of communication terminals, and to measure a flow rate of packets to be transmitted or received for every communication terminal to which power is being supplied, out of the communication terminals targeted for the power supply in each time period, and to supply power to at least one communication terminal to which power is not yet being supplied, out of the communication terminals targeted for the power supply, when the measured flow rate of packets in any communication terminal becomes not less than a predetermined threshold.

16. The network system having a plurality of communication terminals to transmit or receive data in a form of a packet and a power supplying device to supply power through a network to said plurality of communication terminals, wherein said power supplying device comprises a power supply controlling unit to set priority for supplying power to said plurality of communication terminals and to preset a count of the communication terminals which are to be targeted for power supply, for every predetermined time period, out of said plurality of communication terminals, and to measure a flow rate of packets to be transmitted or received for every communication terminal to which power is being supplied, out of the communication terminals targeted for the power supply in each time period, and to supply power to at least one communication terminal to which power is not yet being supplied, out of the communication terminals targeted for the power supply, in accordance with the priority for supplying the power, when the measured flow rate of packets in any communication terminal becomes not less than a first threshold, and on an other hand, to stop the power supply to the communication terminal in which the flow rate becomes not more than a second threshold being less than the first threshold.

17. The network system according to claim 16, further comprising a power supplying section, a packet flow rate measuring section to measure the flow rate of packets to be transmitted or received for every communication terminal to which power is being supplied, out of the communication terminals targeted for the power supply in each time period; and a control section to supply power through said power supplying section to at least one communication terminal to which power is not yet being supplied, out of the communication terminals targeted for the power supply, when the measured flow rate of packets in any communication terminal, obtained from said packet flow rate measuring section, becomes not less than a first threshold, and on an other hand, to stop the power supply to the communication terminal in which the flow rate becomes not more than a second threshold being less than the first threshold.

18. The network system according to claim 17, wherein said control section holds, when a packet arrives at the communication terminal to which the power is not yet being supplied, the packet and supplies the power to said communication terminal to which the power is not yet being supplied through said power supplying section and transfers the arrived packet to said communication terminal to which the power is not yet being supplied.

19. The network system according to claim 17, wherein said control section has a schedule to set the priority for supplying the power to a group of the communication terminals which are to be targeted for power supply or supply stop, and to preset the count of the communication terminals which are to be targeted for the power supply, for every predetermined time period, out of the group of communication terminals.

* * * * *